May 16, 1967 A. DRITZ 3,319,863
STAPLING DEVICE

Filed March 1, 1965 7 Sheets-Sheet 1

May 16, 1967 A. DRITZ 3,319,863
STAPLING DEVICE

United States Patent Office 3,319,863
Patented May 16, 1967

3,319,863
STAPLING DEVICE
Arthur Dritz, 171 Beach 125th St.,
Rockaway Park, N.Y. 11694
Filed Mar. 1, 1965, Ser. No. 436,037
2 Claims. (Cl. 227—71)

This application is a continuation-in-part of my copending applications S.N. 186,827 filed Apr. 6, 1962 now patent No. 3,182,879, issued May 11, 1965 and my abandoned application 57,668 filed Sept. 22, 1960.

This invention generally relates to a novel tool for applying a fastening device to either a single sheet of material or a plurality of sheets of material. In one embodiment, this invention relates to a novel tool for applying fastening devices in the nature of flexible staples to two or more layers of material. In another specific embodiment this invention relates to a novel stapling device which does not require an anvil section.

There are a number of stapling devices now available on the market which are used in offices throughout the country for fastening two or more sheets of paper together. Similar stapling devices are used in the construction industry and are also used to a lesser extent in the garment making industry. The staples themselves are usually U-shaped pieces of small diameter wire that are arranged in parallel aligned fashion so that they can be fed under a reciprocating hammer member which in turn forces the open end of the staple through the plurality of sheets of material and an anvil bends the open ends of the staple either outwardly or inwardly so as to effect a fastening action as far as the sheets of material are concerned. This general type of stapler is so well known that further description thereof is not necessary.

The above-mentioned type of conventional stapler is highly useful for many applications, but nevertheless can be considered as having certain disadvantages. First of all, nearly all of such stapler-type devices require an anvil. Since both the hammer and the anvil must be joined together in some fashion, the area which can be stapled is thereby usually limited to a certain distance inwardly from the peripheral border of the sheets of material to be joined.

Also, the well-known type of stapling device is unsuitable insofar as fastening together textile materials is concerned because the sharp ends of the staples tend to cut through and unfavorably effect the textile by virtue of the metallic nature of the staple. In addition, the conventional metallic staple is constructed of rather stiff metallic material which is not easy to remove manually without the aid of mechanical devices and is often disadvantageous to handle, particularly because of its sharp edges. Furthermore, there are those instances wherein two pieces of paper which have been stapled together are pressed so closely together at and near the point of stapling that one has great difficulty in seeing what might have been written under or around the stapled area.

I therefore believe that I am the first to have conceived the idea that it would be highly advantageous to develop a flexible staple, preferably made of non-metallic material (such as plastic or ribbon) so as to provide stretchability. More importantly I have conceived of a device for applying such a staple.

It is therefore a first object of this invention to provide a stapling device which does not require an anvil. It is another object of this invention to present a stapling device which can utilize flexible non-metallic staples. It is an additional object of this invention to provide a staple that is flexible, resilient, stretchable, easy to remove and easy to adjust once it has been applied in place. A specific object of this invention is to make staples out of flexible rubber and plastic materials and to provide a device for applying such staples.

The invention will be illustrated by the following drawings wherein.

Figure 1:
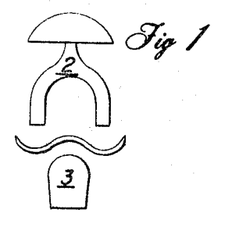
FIGURES 1, 2, 3 and 4 show in diagrammatic fashion the sequence of changes which a staple would undergo in accordance with the teachings of one embodiment of this invention.
Figure 2:
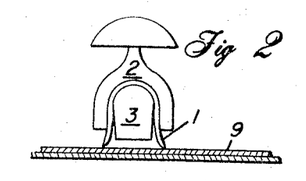
Figure 3:
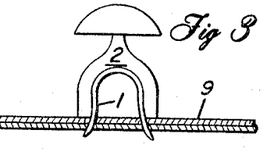
Figure 4:
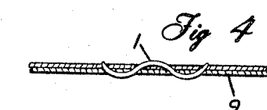

FIGURES 1, 2, 3 and 4 show in diagrammatic fashion the sequence of changes which a resilient staple would undergo in accordance with the teachings of one embodiment of this invention. FIGURE 1 shows the staple in its "natural" condition which is a rather flat and elongated condition with the exception that the ends are turned up slightly and the middle raised. FIGURES 2 and 3 show the configuration of this staple when it is deformed under the action of a stapling mechanism into a shape so that it can be inserted into the material to be fastened. FIGURE 4 shows the same staple after it has been properly inserted in the material for fastening and after the temporary deforming action of the stapling mechanism has been removed. It will be noted in FIGURE 4 that the staple is in essentially its original "natural" shape again with its ends and middle upturned with respect to the remaining portion of the staple. The cloth is designated by the numeral 9 in FIGURES 2, 3 and 4. The staple can be made of either metallic, rubber or plastic material, but is preferably made of rubber or plastic material.

More specifically, in FIGURE 1 it will be noted that the staple 1 is positioned under a driving member 2 and above a supporting member 3. FIGURE 2 shows that as the driving member 2 is brought downwardly toward supporting member 3, the staple 1 will be deformed into a generally inverted U-shaped configuration. As the staple is so deformed, the two pointed ends are positioned so that they can be pushed through two or more layers of material 9. When the staple is deformed in this manner, it is important in accordance with this invention not to deform the staple beyond its elastic limit. In other words, it is desired to only temporarily deform the staple to the configuration shown in FIGURES 2 and 3 so that when the supporting member 3 is withdrawn (see FIGURE 3) and then the driving member 2 is withdrawn (see FIGURE 4), the staple 1 will return to essentially its original configuration as is shown in FIGURE 4.

It will be noticed in comparing FIGURES 3 and 4 that during the latter stages of the downward movement of driving member 2 that the supporting member 3 withdraws backwardly out of the way so that after the staple has been pushed into contact with the material to be fastened the staple can return to its original configuration. Withdrawal can be suitably effected with any suitable cam or lever arrangement, and such an arrangement would be obvious to those skilled in the stapler art.

Figure 24:
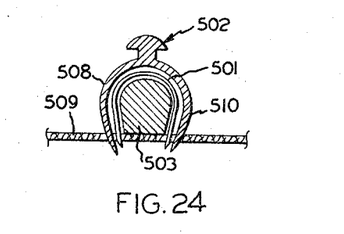
FIGURE 24 is an end sectional view of another modification of my invention which is similar to that shown in FIGURE 2.

FIGURE 24 shows a modification of the concept illustrated in FIGURE 2. In FIGURE 24 the downwardly depending arms 508 and 510 of the driving member 502 are sharpened or pointed at their lower extremities. These points penetrate the material 509 before the supporting member 503 is withdrawn, and the perforations thus formed in the material enable the staple 501 to thereafter pass through the material with greater ease. In a sense, the perforations can serve as a guide for the ends of the staple. This embodiment is of particular utility when working with tough or closely woven materials. This embodiment also permits staples with relatively blunt ends to be used. The staple 501 shown in FIGURE 24 is preferably of the type shown in FIGURES 1-4, but it could be of the type shown in FIGURES 9-10.

Figure 25:
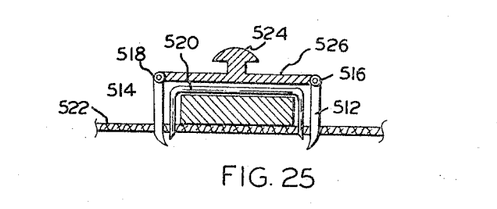
FIGURE 25 is an end sectional view of another embodiment of a stapling device which is somewhat similar to that shown in FIGURE 24.

FIGURE 25 shows a fastening device which could be considered as a modification of FIGURES 1-4, but which differs in several respects. This device is particularly suited for staples of the type shown in FIGURES 9-10, which bends inwardly rather than outwardly. In this device the driving member consists of a head section 524 having two downwardly depending piercing arms 512 and 514 that are pivotally mounted at 516 and 518 so that they can be swung outwardly and pass over the staple as the top section 526 is raised from the material. The staple 520 can then resume its original or natural position and could finally assume any of the positions shown in FIGURES 26-29.

Figure 26:
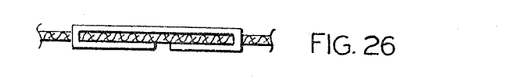
FIGURE 26 is a view of a staple that has ended up with its ends nearly abutting each other.

FIGURE 26 shows a staple that has ended up with its ends abutting or facing each other.

Figure 27:
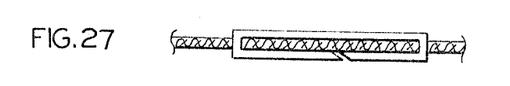
FIGURE 27 shows a staple having inclined ends that overlap at an angle.

FIGURE 27 shows a staple having inclined ends (as compared with FIGURE 26) or ends that overlap at an angle, but still abut or face each other.

Figure 28:
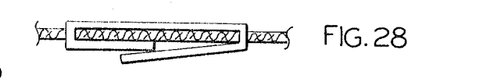
FIGURE 28 shows a staple having ends that overlap each other.

FIGURE 28 shows a staple having ends that overlap each other.

Figure 29:
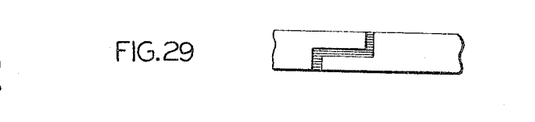
FIGURE 29 shows a staple having ends that partially overlap and partially abut each other.

FIGURE 29 shows a staple having ends that partially overlap and partially abut each other.

The staples in FIGURES 26-29 may have their ends coated with adhesive so that the abutting or overlapping ends will bond together to form a unitary loop-type staple. If the adhesive is in encapsulated form and covers the ends of the staple, then when pressure is applied to ends of the staple when the ends are abutting or overlapping or in their most closely adjacent relationship, the encapsulated adhesive will be freed and can thereafter suitably cement or "weld" the ends of the staple together, which may or may not include cementing or welding to the material to be fastened. For purposes of clarity in FIGURES 26-29 no attmept has been made to show encapsulated adhesive on the ends of the staples, but it will be understood such adhesive can be placed there or omitted, as desired.

The staples in FIGURES 26-29 may also consist of certain uncured rubbers or silicone rubbers that will bond together or fuse together when merely brought into contact with each other under slight pressure, and without any adhesive.

The staples in FIGURES 26-29 are preferably made of either metal, rubber or plastic, but may also be made of impregnated types of cloth and paper in which plastics or other materials are used to treat the material to provide resiliency.

Figures 5, 6:
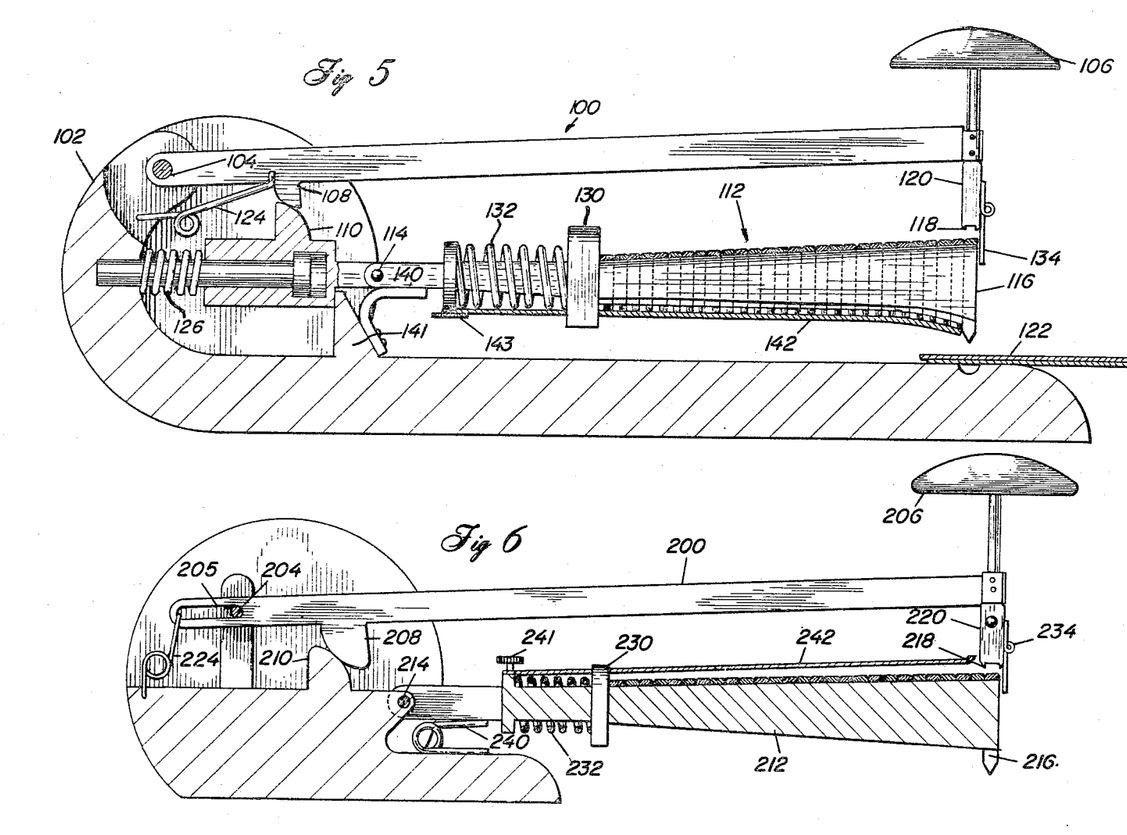
FIGURES 5 and 6 are longitudinal cross sectional views illustrating several ways in which the feed track mechanism of a stapler can be arranged so that the feed track will withdraw from under the outermost staple.

FIGURE 5 is a longitudinal cross sectional view of a stapler which particularly illustrates the mechanism whereby staple supporting and feed track member can be withdrawn when the outermost staple is in position under the head member and ready to be pushed into the textile material. In FIGURE 5 it will be seen that rod 100 is hinged to a combined rear and bottom portion 102 by means of a pin 104. When the knob 106 is pressed downwardly it causes the cam 108 to contact cam 110 which is then forced in a backward direction (to the left). The staple supporting and feed track member 112 is hingedly connected to cam member 110 by means of a pivot pin 114 and when cam member 110 is forced backward (to the left) track member 112 is also forced backward (to the left). The outermost staple 116 is prevented from moving to the left by projection 118 located on the back bottom side of staple driving member 120. Projection 118 is sharp enough to penetrate between the outermost staple 116 and the next closest staple and it severs the thin layers of hardened glue or adhesive which is usually used to bind a plurality of staples together.

As the staple driving member 120 is caused to move downwardly by hand pressure upon knob 106, cam 108 on rod 100 continues to force cam 110 further to the left. Since the outermost staple 116 cannot move to the left with staple supporting and feed track member 112 (it being prevented from doing so by means of projection 118) the staple supporting and feed track member 112 is eventually withdrawn completely from under the outermost staple 116. Driving member 120 can now force the outermost staple 116 downwardly so that its points penetrate and completely encircle the cloth 122 in the manner generally set forth with respect to FIGURES 1-4. As hand pressure is removed from knob 106, rod 100 is forced upwardly by spring 124. Cam 108 is withdrawn from contact with cam 110 and the spring 126 moves cam section 110 forward (to the right). The staple supporting and feed track member 112 is thus moved forward to its former position under driving member 120. Sliding member 130 activated by spring 132 forces the plurality of staples on the support and feed track member 112 toward the driving member 120. The staples are prevented from being moved too far to the right by means of spring plate 134 attached to the front side of driving member 120.

It will be noted that the feed track 112 is hinged at 114 so that it can move downwardly as the driving member 120 contacts it. Thus, rod 100 is permitted to move downwardly until the action of cams 108 and 110 withdraw the support and feed track mechanism 112 from under the outermost staple 116. The spring 140 supports the member 112 but permits it to move downwardly a limited distance under pressure applied downwardly upon driving member 120, permitting cam section 108 to lower and force cam section 110 backwardly until the feeding mechanism 112 is completely withdrawn from under the outermost staple 116. Fulcrum 141 partially supports the cam section 110. The staple feeding and support mechanism 112 later returns to its original position. Bar or plate 142 is located under the mechanism 112 and prevents the opposite open ends of the staple from opening far enough to interfere with the cloth when the feed track mechanism is pushed downwardly. Bar 142 is fastened at one end by screw 143 to member 112 and the intermediate portion of bar 142 freely slides through sliding member 130. As the outermost staple 116 is pushed forward toward the end of the stapling cycle, the points of the staple clear bar 142 and open widely in the manner shown with reference to FIGURES 2 and 3.

Figures 16, 17:
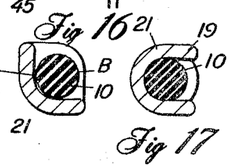
FIGURE 16 is a sectional view along 16—16 of FIGURE 15.
FIGURE 17 is a sectional view along 17—17 of FIGURE 15.

Note that instead of spring plate 134 the two needle-like arrangements shown in FIGURES 16 and 17 could be employed to restrict outward movement of the staple. The action of cam sections 108 and 110 can be regulated so that complete withdrawal of the support and feeding mechanism from beneath the staple can occur at precisely the correct time.

FIGURE 6 illustrates another device which will permit the support and feed track mechanism to be withdrawn from under the outermost staple. In the figure the outermost staple 216 is pushed forward (to the right) and off the support and feed track mechanism 212. The knob 206 is pressed downwardly by hand which lowers rod 200 which in turn is swiveled at sliding fulcrum point 204. Cam 208 contacts cam 210 causing cam 208 to move forward (to the right). Rod 200 is free to move forward due to the slot 205. Driving member 220 descends and the lip or projection 218 on the backside of driving member 220 forces its way between the outermost staple 216 and the staple next to it. As the driving member 220 is lowered it is forced to move forward by the action of cams 208 and 210 and lip or projection 218 forces staple 216 to the right until it clears the lower support and feed track mechanism 212.

In FIGURE 6 a plate 242 overlies the staples to hold them in position on track 212. Plate 242 is held at one end by screw 241 and its intermediate portion freely slides through sliding member 230. Spring 224 biases the left end of arm 200 upwardly and spring 240 biases member 212 upwardly. Member 212 is pivoted at 214. Spring 232 biases sliding member 230 to the right. End plate 234 limits the rightward movement of the outermost staple.

Figure 7:
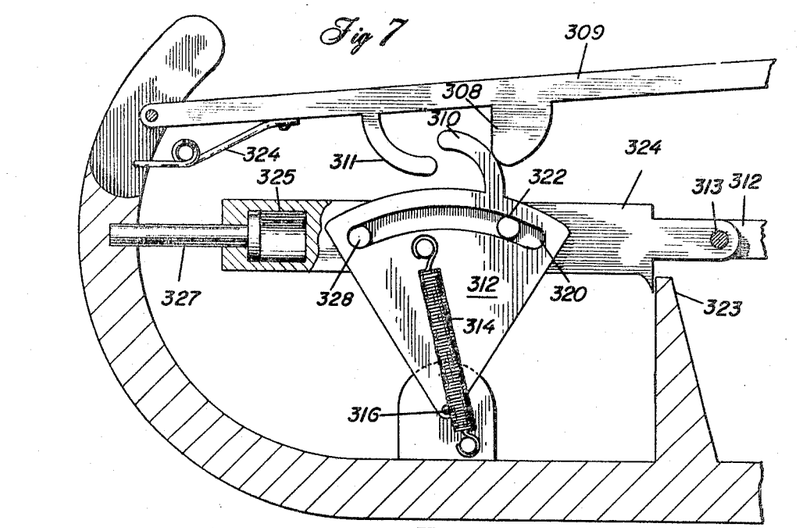
FIGURES 7 and 8 are fragmentary longitudinal cross sectional views illustrating two additional ways in which the feed track of a stapler can be designed so that it will withdraw from the outermost staple.

FIGURE 7 illustrates another arrangement by which the support and feed track mechanism may be withdrawn from under the outermost staple. This figure shows a tripping arrangement whereby the detract mechanism 312 is not withdrawn until a specfic moment. This causes the support and feed track mechanism 312 (pivoted at 313) to be withdrawn suddenly rather than gradually as is the case in FIGURE 5. When cam 308 contacts cam 310 it causes the tripper 312 to swivel to the left (counter clockwise). Spring 314 moves to the left of the swivel point 316, causing the downward pull of spring 314 to trip 312 to the left, or in other words 312 moves with a sudden swivel to the left (counter clockwise). As member 312 does this, the right end of the slot 320 contacts pin 322 attached to arm 324 which moves to the left carrying the support and feed track mechanism 312 with it. The mechanism 312 is thus withdrawn from under the outermost staple in substantially the same manner as has been explained in connection with FIGURES 5 and 6. When arm 309 is moved back to its original position, cam 311 contacts the underside of cam 310 and causes the tripper 312 to swivel to the right (clockwise). Spring 314 passes to the right of fulcrum point 316 and tension of this spring causes 312 to trip to the right. The left end of slot 320 moves pin 328 (attached to the arm 324) to the right, which in turn moves mechanism 312 to its original position in much the same manner as described in relation to FIGURES 5 and 6.

Arm 324 is held up by fulcrum 323 and its left end has a recessed slot 325 which is adapted to slidably engage guide 327. The parts of the stapler not shown in FIGURE 7 may be essentially the same as set forth in either FIGURES 5 or 6.

Figure 8:
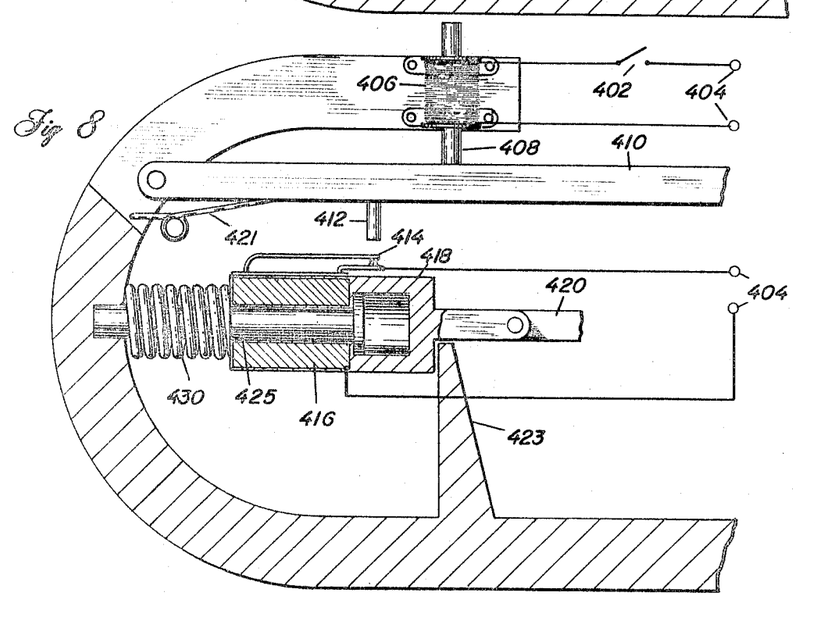

FIGURE 8 illustrates still another embodiment in accordance with this invention which utilizes electrical energy to control the action of the stapler. In this figure it wil be seen that the switch 402 attached to electrical outlet 404 can be energized so that electricity will flow to solenoid 406, the solenoid thereby being activated. Plunger 408 then can move downwardly and depress arm 410 which in turn causes member 412 to contact and close switch 414. The closing of switch 414 activates solenoid 416 (imbedded in moving arm 418) which moves arm 418 to the left, in turn causing the support and feed track mechanism 420 to move to the left and from under the outermost staple in much the same manner as described in connection with FIGURES 5 and 6. Spring 430 biases arm 418 to the right and spring 421 biases arm 410 upwardly. Member 418 may be slideably supported on its right end by fulcrum 423 and slideably engaged with an anchored guide 425 on its left end. The parts of the stapler not shown in FIGURE 8 may be the same as is shown in FIGURES 5 and 6.

Figure 9:
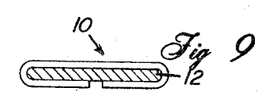
FIGURES 9, 9a and 10 illustrate in a general fashion how the shape of a staple can change as it moves from one end of a feed track mechanism to the other.
Figure 9A:
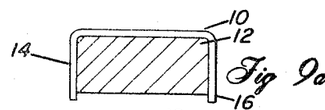
Figure 10:
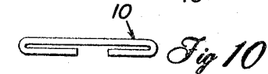

FIGURES 9, 9a and 10 are sketches illustrating in very broad outline how a generally oblong staple can change its shape as it moves from one end of the feed track mechanism to the other. In this embodiment, a rubber band 10 (or a band made of similar flexible plastic material) is initially in the form of a more or less nearly closed loop or oblong O and it retains this form due to the natural resiliency which it possesses and due to the method in which it has been molded or formed. The feed member 12 (upon which a plurality of such rubber bands can be placed) can progressively increase in cross sectional area along its length until it reaches such a size that the side legs 14 and 16 of the band 10 are bent out of shape as shown in FIGURE 9a. The contrast between the band 10 in FIGURES 9 and 9a will be readily noted, the band in FIGURE 9 taking the shape generally of an elongated or oblong O while in FIGURE 9a the band takes the general shape of an open U pointed in a downward direction.

FIGURES 11-14 are end views of a stapler unit showing the relative positional relationship of the staple and the other elements of the stapling mechanism at the time that the staples reach the end of the track feed mechanism 12 and are directly under the plunger head. It is obvious that if the staple 10 is made of non-metallic material which is flexible, such as a rubber band-like material, the staple cannot, by virtue of its own strength and rigidity, forcibly pierce through several layers of material such as paper or cloth. Accordingly, there must be associated with the plunger head of the stapler mechanism some device which will preliminarily pierce the material to be fastened so that the flexible staple can thereafter readily pass therethrough. This plunger head piercing mechanism must also be capable of being withdrawn from the pierced area so that the staple will not be damaged or dislodged by its withdrawal. In FIGURES 11-14 this piercing mechanism is shown diagramatically as consisting of a pair of plunger piercing arms 21 which come into play during the stapling operation. Initially the plunger piercing arms 21 wil take the position shown in FIGURE 11, which is shown in a substantially parallel relationship. A detailed view of a section of these piercing arms 21 is shown in FIGURES 15-17. As is shown in FIGURE 15, the piercing arm 21 actually consists of a needle-like extension having a hollowed-out portion which is designed to accommodate the ends of the flexible staple 10. The hollowed-out portion of piercing plunger 21 has the shape as shown in FIGURES 16 and 17. FIGURE 16 clearly shows the open side "B" which permits feeding of staples from the track feed member into the piercing needle. FIGURE 17 shows the lower guideway 19 for facilitating guiding of the staple into proper position. Incline section 45 also serves to direct the flexible staple in the desired direction.

Figure 11:
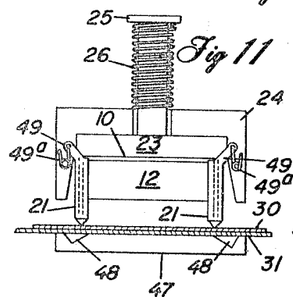
FIGURES 11–14 are end views of a stapler unit in accordance with this invention.
Figure 12:
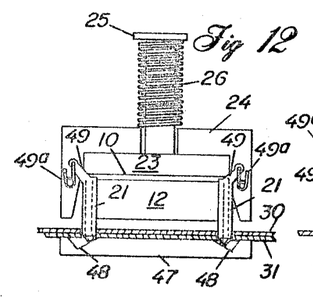

As is shown in FIGURE 11, there are actually two of these piercing plunger portions. As will also be noted in FIGURE 11, the plunger head actually consists of two separate portions 23 and 24. By pressing down upon the top of plunger 25 a certain force is transmitted through spring 26 to the top of element 24 which in turn is forced downwardly. As the element 24 moves downwardly (compare FIGURES 11 and 12) the plunger piercing arms 21 pierce the cloth as shown in FIGURE 12. As the piercing arms continue to move downwardly, the inclined guideways 48 of anvil 47 cause the lower ends of piercing arms 21 to diverge outwardly and away from each other. The plunger arms 21 are permitted to move in this fashion because they are hingedly attached by means 49 to the plunger head and are free to move laterally to the extent indicated in FIGURE 13. However, at a given point, the element 24 resists further downward movement and when such a point is reached, then the plunger head 23 takes over as the only force moving the staple 10 downwardly toward the two sheets 30 and 31 which are to be fastened together.

Figure 13:
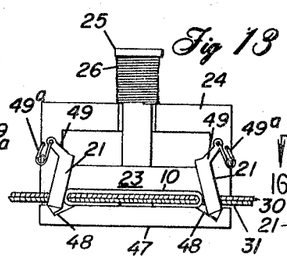

In comparing FIGURES 12 and 13 it will be noted that at about the time that elements 21 pierce the layers 30, 31, the forward end of the staple feed track 12 withdraws so as to permit the plunger head 23 to then push downwardly upon staple 10 so that it will assume the position shown in FIGURE 13. When the staple has fastened itself to the cloth (as shown in FIGURE 13) the piercing arms are easily withdrawn without dislodging the staple, with the result that the stapler is again ready to operate (see FIGURE 14). It will be noted that the staple 10 in the layers 30, 31 has about the same shape as that discussed in FIGURE 7 by virtue of the fact that such shape is the shape which the staple naturally assumes when it is unrestricted.

The hinge means 49 are preferably biased by a spring or other equivalent means (e.g. see 49a in FIGURE 11) so that unless restricted, they will assume a substantially parallel relationship. Those skilled in this art will readily see that instead of having arms 21 hingedly attached to member 24, it would involve no invention to merely construct these arms of sufficiently flexible and resilient material so that they could deform under the stresses indicated in FIGURES 12 and 13 to the desired positions.

Figure 14:
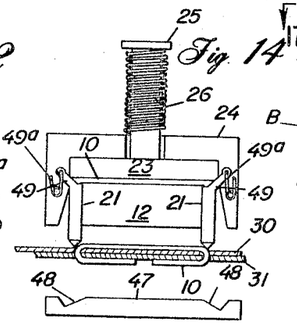
Figure 15:
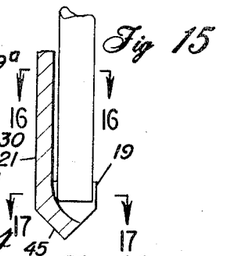
FIGURE 15 is a fragmentary end view of a staple and staple shielding component in accordance with this invention.

In FIGURES 13 and 14 the flexible staple 10 (for example one made out of rubber) is held in fastening position by virtue of its own resiliency and prior history of formation. In some cases a more secure fastening action may be desirable. This can be accomplished by any of a number of ways.

Figure 18:
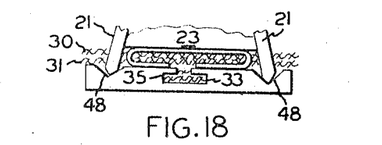
FIGURE 18 illustrates a staple fastening arrangement in accordance with this invention.

One such means is illustrated in FIGURE 18 wherein the same numerals are used as were used with FIGURES 11-14 and wherein it is shown that a small amount of adhesive (such as an epoxy adhesive) material may be fed to the adjacent ends of staple 10 to either bond them together and/or to bond them to the one or both of the layers 30, 31 to be fastened together. Feeding of the adhesive to said area may be accomplished by means of a wick 33 (or other equivalent device) depending into liquid adhesive reservoir 35. Liquid adhesive reservoir 33 is shown in cross section and it could obviously be filled periodically by merely lifting out the wick, filling the reservoir and then replacing the wick.

Figure 19:
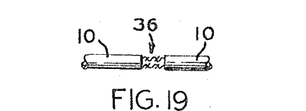
FIGURE 19 shows a means whereby staples can be cemented or welded together in accordance with this invention.

Another such means might involve providing the ends of flexible staple 10 with adhesive (such as an epoxy adhesive) in encapsulated form so that when pressure is applied to these ends in their most closely adjacent positions (i.e. the downward pressure of head 23), the adhesive will be freed and the liberated adhesive can then suitably cement or "weld" the ends of the staple together, which may or may not also include cementing or welding to the material to be fastened. Such an arrangement is generally illustrated in FIGURE 19 where 10 is the staple and 36 represents the encapsulated adhesive. Certain uncured rubbers or silicone rubbers would bond or fuse together when brought in contact with each other without any adhesive.

Another such means which might be used, particularly when plastic or synthetic resin staples are used, a concentrated heating means, preferably electrical, adjacent the area of the ends of the plastic staple which would function to provide enough heat to melt or fuse the ends of the flexible or plastic staple together or to fuse the ends of the layers of material to be fastened together.

Still another means might include the preliminary mechanical shaping of the ends of the flexible staple so that when they were brought together or in overlapping relationship, they would interlock and resist forces tending to pull them apart.

Figure 20:
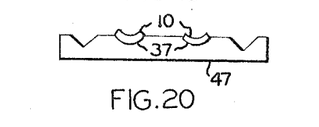
FIGURE 20 shows a staple shaping means in accordance with this invention.

The anvil portion 47 shown in FIGURES 11-15 could be suitably shaped and molded so as to facilitate the movement of the ends of the staple together once the ends of the staple had passed through (with the aid of the piercing arms) the material to be fastened. In other words, the anvil portion 47 could be shaped in numerous ways to serve as a guide for the ends of the staple. Such shaping is generally indicated at 37 in FIGURE 20, wherein 10 is a fragmentary view of the staple and 47 is the anvil.

Figure 21:
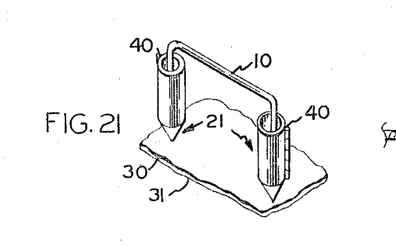
FIGURE 21 illustrates another staple piercing arm device in accordance with this invention.
Figure 22:
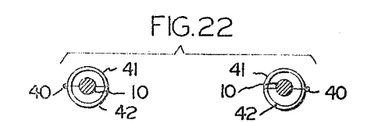
FIGURE 22 shows cross sectional views of the piercing arms of FIGURE 21 in closed and open positions.
Figure 23:
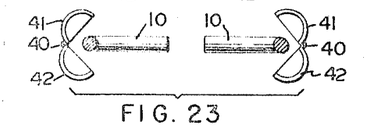
FIGURE 23 is a cross sectional view of the piercing arms of FIGURE 21 when said arms are in their open position.

It would not involve invention to use, instead of the type of piercing arms shown in FIGURES 11-17 a piercing arm of the type shown in FIGURES 21-23. In FIGURE 21 the flexible staple 10 is shown in position within an essentially hollow hinged arm 21, consisting of hinge 40, and hinge halves 41 and 42. Before or during the piercing operation hinge halves 41 and 42 are disposed as shown in FIGURES 21 and 22. After the arm 21 has pierced the material to be fastened, the hinge halves 41 and 42 could be manually or mechanically opened as shown in FIGURE 23 which would then allow the flexible staple to be pushed or driven into place by the plungerhead and also allow the hinge halves to be withdrawn without disturbing or dislodging the staple. Other similar arrangements and variations will readily occur to those skilled in this art. The hinge halves 41 and 42 could be manually or mechanically closed after the staple was in place and the plunger head had been withdrawn.

Figure 30:
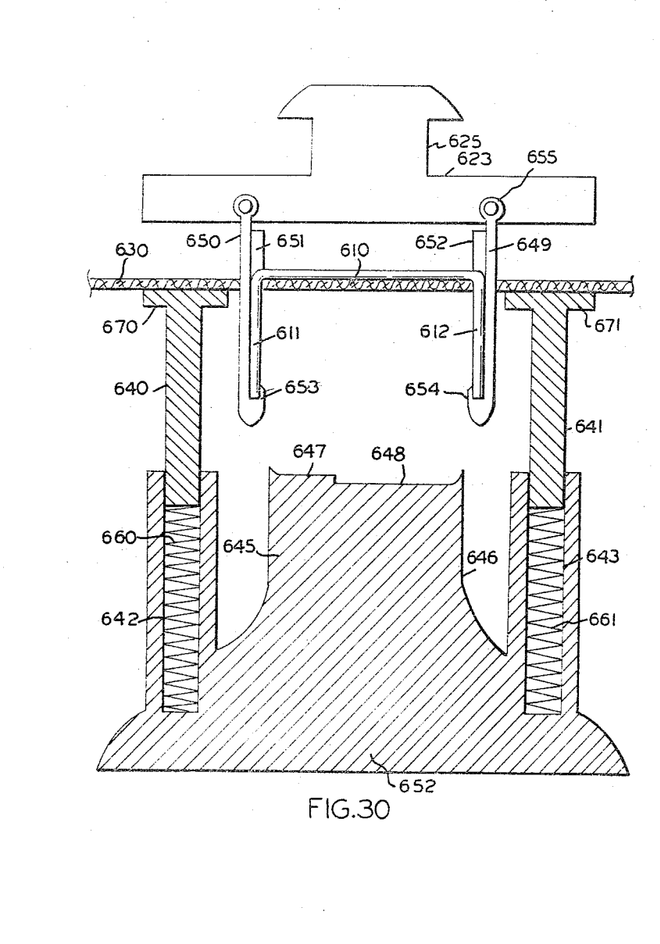
FIGURES 30–32 are end sectional views of a plunger means and anvil means in accordance with another embodiment of this invention.
Figure 31:
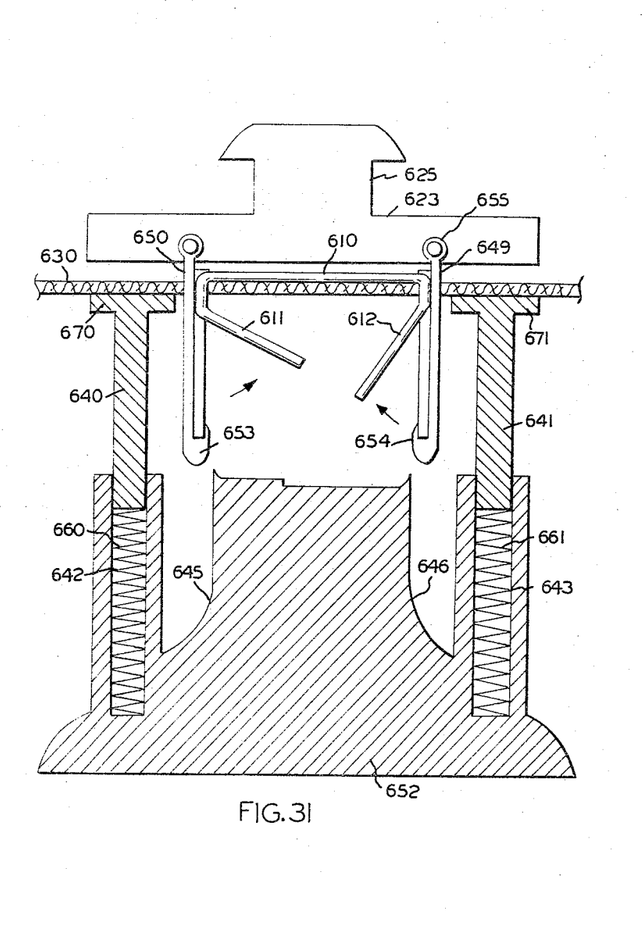
Figure 32:
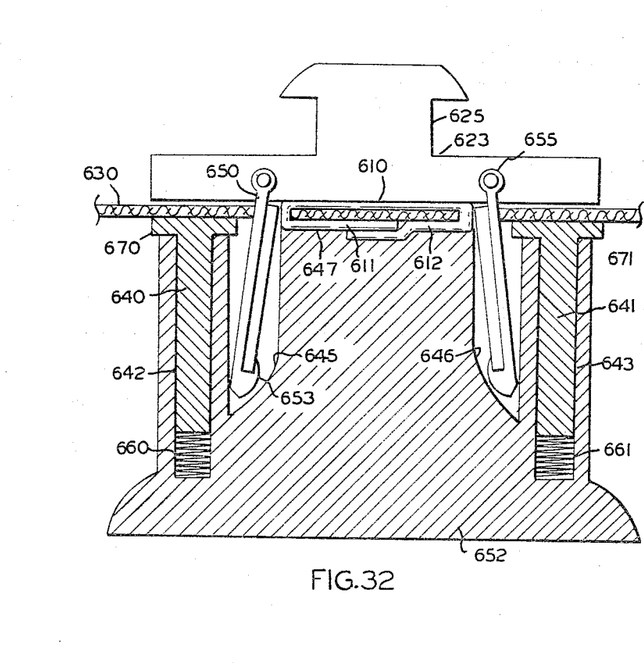

FIGURES 30-32 illustrate another embodiment of this invention. In these figures a knob 625 is shown as being attached to a plunger bar 623. Depending downwardly from the bar are two spaced-apart piercing arms 649 and 650. These piercing arms 649 and 650 are hingedly mounted in place by means of pivot pins 655, thus allowing the piercing arms to be pivoted away from each other when desired (as is shown in FIGURE 32). The lower extremities of piercing arms 649 and 650 are tapered or pointed so that they can easily penetrate paper or cloth. The piercing arms have hollowed out channel sections 651 and 652 which are designed to accommodate the legs 611 and 612 of a flexible staple 610. Staple 610 can easily be manually inserted into the channels of the piercing arms, but mechanical means could also be used. If the flexible staples are preformed so that the legs 611 and 612 have a tendency to fold in toward each other, the piercing arms channels are preferably provided with some sort of temporary restraining means (such as lips 653 and 654) that will maintain the staple in the shape of an inverted U until the proper instant of time. The channels in the piercing arms are preferably somewhat longer than the legs of the staple, and the reason for this will be obvious later.

However, before further explaining the operation of the piercing arms, reference should be made to the lower components of the embodiment of FIGURES 30–32. The base 652 of the unit consists of two recessed cavities 642 and 643 which house springs 660 and 661 respectively. Support members 640 and 641 are resiliently biased in an upward direction by springs 660 and 661. Inwardly of cavities 642 and 643 there are located spaced-apart channels 645 and 646 into which the piercing arms 650 and 649 are adapted to move as the piercing arms descend. The upper portions of supports 640 and 641 are preferably broadened or flattened so as to constitute a sort of platform surface for the paper or textile material 630 placed thereon. These platforms are shown as 670 and 671.

Initially the flexible staple can be manually placed within the channels 651 and 652 of piercing arms 650 and 649 respectively. The paper or textile material 630 is then placed upon the platforms 670 and 671. By thereafter pushing the knob 625 in a downward direction the piercing arms 649 and 650 will penetrate the paper or cloth 630 to the extent shown in FIGURE 30. Since the flexible staple 610 rests within the channels 651 and 652, the staple itself does not have to bear any of the penetration stress forces.

As the plunger 623 continues to move downwardly (see FIGURE 31) the channels 651 and 652 (being longer than the legs 611 and 612 of the staple) will continue downwardly while the flexible staple itself can go no further downwardly than is shown in FIGURE 30. When this relative movement between the staple legs and the channels of the piercing arms occur, the staple legs will in effect be lifted upwardly so that the lips 653 and 654 no longer restrain them. If the legs of the staple were preformed as noted previously, then the legs 611 and 612 would move inwardly toward each other in the manner shown in FIGURE 31.

As the plunger 623 continues to move downwardly (see FIGURE 32) the legs 611 and 612 will be pushed together in overlapping relationship by virtue of the action of the contoured top portions 647 and 648 of the base 652.

It will also be noted that as the bottom ends of the piercing arms move downward they contact the tapered or inclined surfaces of cavities 645 and 646, which causes the piercing arms to diverge as shown in FIGURE 32. Then, as the downward push upon the plunger 623 is removed, the piercing arms will rise and eventually exit through the perforations that they made when entering the paper.

Figure 33:
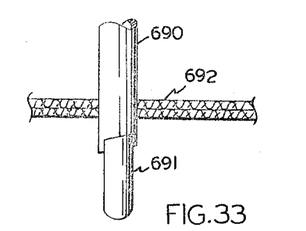
FIGURE 33 is a fragmentary side view of a hollow needle useful in accordance with this invention.

In FIGURES 30–32 the lower ends of the piercing arms are shown as solid pointed tips. However, it would involve no invention to have the bottoms of these tips made flat so that the piercing arm could act as a punch, if desired. Also, the piercing arms can be made hollow and the staple fed therethrough after the piercing arm has penetrated the paper or cloth. In this latter instance, the piercing arm is withdrawn upwardly at the same time that the staple is fed downwardly so that part of the staple will remain above the paper or cloth and part below. A hollow needle 690 is illustrated in FIGURE 33. The lower end of a staple 691 is shown passing out of the lower hollow end of the piercing arm 690 after the piercing arm has penetrated two layers of paper or cloth 692.

Figure 34:
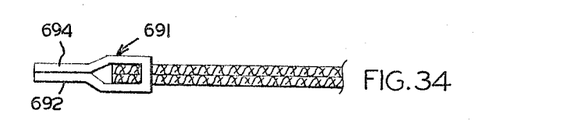
FIGURE 34 is a sectional view showing the disposition of one type of staple in accordance with this invention.

FIGURE 34 illustrates the case where a staple that has been preformed into a loop shape, and then one end inserted through the cloth (manually or with the aid of some sort of piercing means) the staple could end up in the shape and position shown. In other words, the end 692 of the staple that has passed through the fabric could be bent upwardly by manual or mechanical means to meet the upper end 694 of the staple (which had not penetrated the fabric). This could be considered as a staple which "snap-closed." If the staple was made of silicon rubber a slight pressure could cause these ends 692 and 694 to adhere firmly together, even if there was no inherent resiliency to get them to automatically assume a loop-shape. Furthermore, the ends 692 and 694 of the staple 691 shown in FIGURE 34 can be pinched together with the fingers to form a tight fastener unit or the ends could be twisted so as to form a fastener unit which cannot be readily dislodged.

Figure 35:
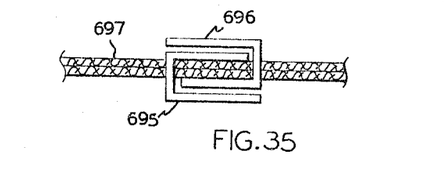
FIGURE 35 is a side view showing the placement of another form of staple in accordance with this invention.
Figure 36:
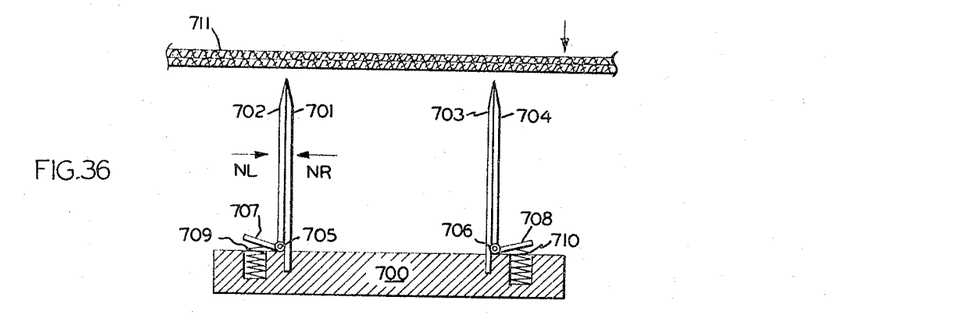
FIGURES 36–39 are fragmentary sectional views of still another embodiment of this invention wherein two upright piercing means are employed.
Figure 37:
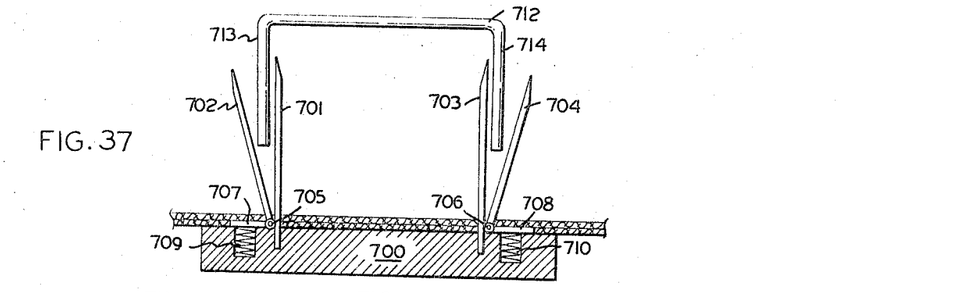

FIGURE 35 shows another possible embodiment of this invention wherein two generally U-shaped staples 695 and 696 have been inserted through two layers of cloth 697. The natural resiliency of the legs of the staples (preformed resiliency) cause them to assume the position shown. The overlapping legs of the respective staples can then be pressed together to form a tighter fastening unit and if they are made of silicone rubber a firm bond will be achieved by self adherence.

FIGURES 36–39 illustrate still another embodiment of this invention wherein two upright piercing means are mounted on a base 700. The piercing means actually comprise two split piercing arms, the left piercing arm consisting of a fixed upright element 701 and a pivotable element 702 and the right piercing arm consisting of a vertically fixed piercing element 703 and a pivotable element 704. As shown, the lower ends of elements 702 and 704 are hingedly mounted at 705 and 706 respectively and are provided with side arms 707 and 708 respectively. Side arms 707 and 708 are attached to springs 709 and 710 respectively so that elements 702 and 704 are actually spring biased to an upright position. Now if a piece of paper or fabric 711 is held in a stretched-out position in a person's hands and then pressed downwardly from the position shown in FIGURE 36 to that shown in FIGURE 37, the paper or cloth 711 will finally rest downwardly against the base 700 and side arms 707 and 708 in such a way that they will be flatened into a horizontal position against the upward force of springs 709 and 710. In this position, the arms of the piercing means are opened and a staple 712 may be manually placed in position by having its legs 713 and 714 inserted into the spread apart jaws of the split piercing arms (see FIGURE 37).

Figure 38:
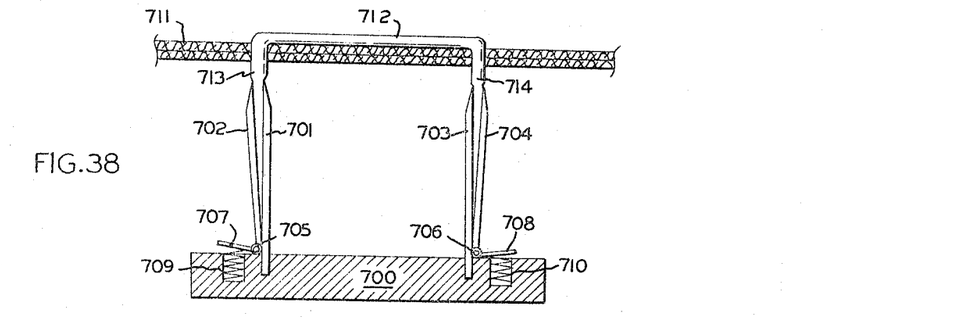

Next, the paper (or fabric) 711 is raised upwardly toward its original position and as it is raised the side arms 707 and 708 return to their original position. In so doing, the open jaws of the piercing arms close around the legs 713 and 714 of the staple and a situation such as is shown in FIGURE 38 results. The jaws 701–702 and 703–704 preferably close around legs 713 and 714 sufficiently tightly and in such a manner that when the paper (or fabric) 711 is raised from the position shown in FIGURE 37 to that shown in FIGURE 38, the holes in the paper (or fabric) 711 are not enlarged. (The rubber legs 713 are compressed.) The finished product therefore consists of two holes in the paper which are tight around the staple. This prevents any sideward play or motion and results in a neat appearance.

Now, if the side arms 707 and 708 are manually depressed (e.g. with the fingers) the jaws of the piercing arms will open and the legs 713 and 714 of the staple will be freed.

Alternatively, the tension that closes the jaws 701–702 and 703–704 can be adjusted so that whereas the jaws will hold the legs of the staple tightly enough so that the paper or fabric can rise to the position shown in FIGURE 38, continued upward movement of the paper or fabric 711 beyond that point will cause the legs of the staple to slip out of the jaws of the piercing means.

Figure 39:
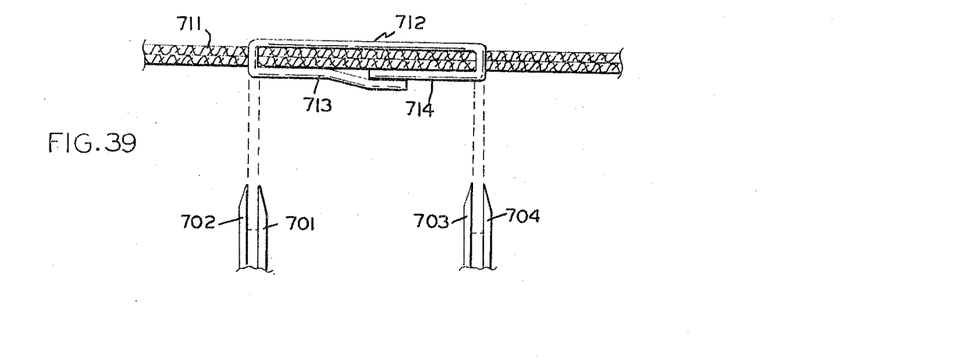

These legs (713 and 714) can then be bent inwardly by manual or mechanical pressure so that they overlap each other as shown in FIGURE 39. These legs can also be preformed or preshaped or prestressed so that they will resiliently snap back into the overlapping position which is in FIGURE 39. If the staple is made of silicone rubber or equivalent material a slight pressure can cause positive and firm bonding of the ends of the staple together (even though there was no preforming).

It will be obvious that instead of a unit wherein only one staple could be manually applied at a time, no invention would be involved in modifying the device in FIGURES 36–39 so that staples could be fed thereto with a feed arrangement such as is shown in FIGURES 5–8.

Figure 40:
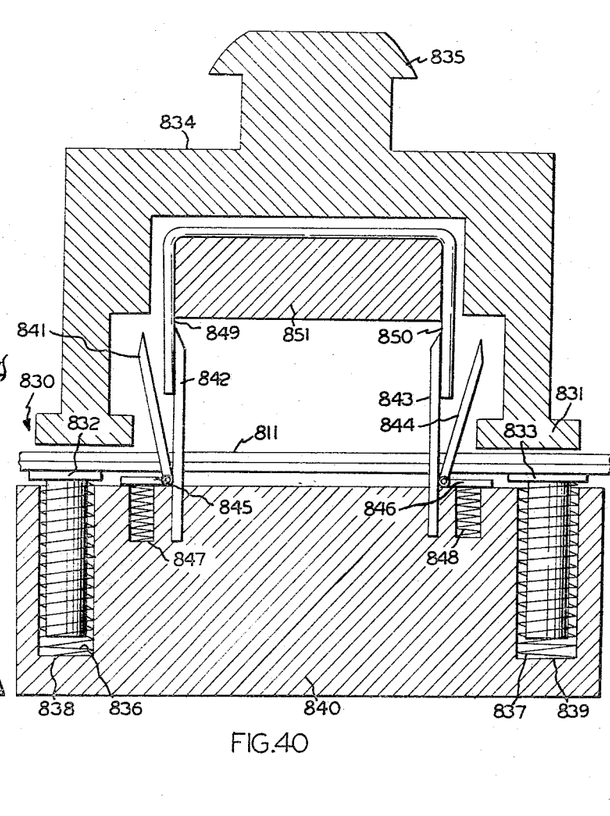
FIGURE 40 shows still another embodiment in accordance with this invention which is an end sectional view incorporating some of the features shown in FIGURES 5–8 and some of the features shown in FIGURES 30–32.

FIGURE 40 shows an arrangement that combines some of the features of FIGURES 36–39 and some of the features shown in FIGURES 5–8 and 30–32. In this embodiment the paper or cloth 811 is gripped between cooperating gripping members 830, 831, 832 and 833. Members 830 and 831 are mounted on the lower side arms of a plunger 834 that can be forced downwardly by means of a knob 835. Members 832 and 833 on the other hand are resiliently mounted (with the aid of springs 836 and 837) within wells 838 and 839 in the base member 840. Thus when knob 835 is pushed downwardly, cooperating gripping members 830–833 grip the paper or fabric 811 and force it downwardly over the closed pointed ends of piercing arm members 841–844. As members 830 and 831 move downwardly, they cause pivot members (or side arms) 845 and 846 to move to the position shown in FIGURE 40 (against the upright biasing force of springs 847 and 848). The jaws of the upwardly extending piercing arms open to receive legs 849 and 850 of a staple that is fed forwardly from a staple feed member 851 (which corresponds closely in operation to the staple feed member 12 in FIGURES 11–14). Now when the plunger 834 is released upwardly the springs 836 and 837 and gripping members 830–833 cooperate to lift the paper or fabric 811—and during this time the jaws of the piercing arms (841–844) close upon legs 849 and 850 of the staple so as to hold it until the relationship of the fabric or paper and the staple is essentially the same as that illustrated in FIGURE 38. (Feed member 851 retracts once the legs of the staple are gripped by the piercing arms, the mechanism for retraction being analogous to that shown in FIGURES 5–8.) The ends of the staple can then pull themselves out of the jaws (as described earlier) and assume the position shown in FIGURE 39 if the staple was preformed so that it would "spring back" to that shape, or the ends could be manually pressed together. (Springs 836 and 837 push the paper or fabric 811 upwardly with such a force that it also pulls the legs of the staple out of the jaws of the piercing means.)

In conclusion, while the foregoing specification and drawing describe the construction, operation and use of some preferred embodiment of the instant invention, it is to be understood that I do not intend to limit myself to the precise constructions and arrangements herein disclosed, since the various details of construction, form and arrangement may obviously be varied to a considerably extent by any one skilled in the art without really departing from the basic principles and novel teachings of this invention and without sacrificing any of the advantages of the invention, and accordingly it is intended to encompass all changes, variations, modifications and equivalents falling within the scope of the appended claims.

What is claimed is:

1. A device for facilitating the passage of fastener elements through at least two layers of material, comprising in combination:
    (a) two elongated piercing means mounted perpendicularly on a base member in substantially parallel relationship,
    (b) each of said piercing means consisting of two sections that are hingedly connected adjacent said base for relative movement,
    (c) one of said hingedly connected sections of each piercing means having a laterally extending member which is adapted to be moved, and
    (d) resilient means contacting said laterally extending member and normally maintaining the hingedly connected sections of each piercing means in a closed position whereby each piercing means is adapted to receive the legs of a fastener element when said piercing means are passed through the material and said members are depressed to separate said sections, and to releasably retain said legs when said members are released.

2. A device for facilitating the passage of a resilient fastener element through at least two layers of material, comprising in combination:
    (a) a plunger head,
    (b) said plunger head being arranged to act upon a resilient fastener element to force it through at least two layers of material,
    (c) said plunger head being located between the upper ends of two rigid piercing members which surround and protect at least a portion of said resilient fastener element during the time that it is being forced through a layer of material,
    (d) each of said piercing members having an elongated channel portion therein for accommodating the legs of a resilient fastener element during the movement of the fastener element downwardly through said layer of material,
    (e) the channel portion of said piercing members being open along the major portion of one side so that the resilient fastener element can be moved laterally out of the channel portion, and
    (f) an anvil member located below said plunger head, said anvil member being provided with contoured side portions which serve to diverge said piercing members, the top portion of said anvil member located between said contoured portions serving as a means for pressing the sides of the resilient fastener element together in overlapping relationship.

References Cited by the Examiner

UNITED STATES PATENTS

| 83,640 | 11/1868 | Kletzker | 227—71 |
| 770,693 | 9/1904 | Nourse | 227—71 |
| 1,815,066 | 7/1931 | Maynard | 227—120 |
| 1,854,647 | 4/1932 | Flood | 227—71 |
| 2,140,588 | 12/1938 | Krantz | 227—121 |
| 2,143,427 | 1/1939 | Abbate | 227—141 |
| 2,483,379 | 9/1949 | Brell | 29—212 X |
| 2,531,985 | 11/1950 | Nasmith | 227—89 X |
| 2,638,714 | 5/1953 | Young | 29—212 X |
| 2,716,748 | 9/1955 | Sutton | 227—89 X |
| 2,778,266 | 1/1957 | Forrester | 85—49 |
| 2,807,185 | 9/1957 | Gaskill | 85—49 |
| 3,101,528 | 8/1963 | Erdmann | 29—450 X |

FOREIGN PATENTS

| 827,687 | 2/1960 | Great Britain. |

GRANVILLE Y. CUSTER, JR., *Primary Examiner.*